United States Patent [19]

Eisele et al.

[11] 4,428,976

[45] Jan. 31, 1984

[54] GEOMETRIC BALANCE ADJUSTMENT OF THIN FILM STRAIN GAGE SENSORS

[75] Inventors: Walter H. Eisele, Malibu, Calif.; Helmut H. A. Krueger, Elgin, Ill.; Robert E. Lajos, Crystal Lake, Ill.; Donald J. Koneval, Arlington Heights, Ill.

[73] Assignee: Gould Inc., Rolling Meadows, Ill.

[21] Appl. No.: 364,550

[22] Filed: Apr. 1, 1982

Related U.S. Application Data

[62] Division of Ser. No. 93,835, Nov. 13, 1979, Pat. No. 4,331,035.

[51] Int. Cl.$^3$ .......................... G01B 7/20; G01L 1/22
[52] U.S. Cl. .................................... 427/96; 427/102; 427/103; 73/1 B; 73/765
[58] Field of Search ................. 427/96, 101, 102, 103; 73/1 B, 765

[56] References Cited

U.S. PATENT DOCUMENTS

| | | | |
|---|---|---|---|
| 2,547,926 | 4/1951 | Cook | 73/766 |
| 2,677,271 | 5/1954 | Faris et al. | 73/766 |
| 3,303,693 | 2/1967 | Stedman | 73/766 |
| 3,697,918 | 10/1972 | Orth et al. | 73/777 |
| 4,185,496 | 1/1980 | Tisone et al. | 73/775 |
| 4,217,785 | 8/1980 | Spoor | 73/766 |

FOREIGN PATENT DOCUMENTS 728606 4/1955 United Kingdom.
1362616 8/1974 United Kingdom.

*Primary Examiner*—James R. Hoffman
*Assistant Examiner*—Richard Bueker

[57] ABSTRACT

A thin film strain gage structure (10, 110) for measuring the strain of an inflectible element (12, 112) wherein the gage is formed on a surface (15, 115) of the element and includes a sensing resistance (16, 116) and an adjusting resistance portion (21, 121). Connecting taps are formed in relationship to the resistors to permit adjustment of the adjusting resistor values by suitable connection to selected ones of the taps. The adjusting resistance is preferably disposed adjacent the sensing resistance so as to be subject to similar ambient conditions. The sensing resistance may be provided in the form of a Wheatstone bridge circuit with the adjusting resistors connected in series with two legs of the bridge. Adjustment of the adjusting resistance may be effected selectively by shorting out portions thereof or by suitably connecting to different portions thereof. In one form, the adjustment is effected so as to provide variable ratio between two portions of the resistance connected between legs of the bridge circuit.

9 Claims, 3 Drawing Figures

GEOMETRIC BALANCE ADJUSTMENT OF THIN FILM STRAIN GAGE SENSORS

This application is a division, of application Ser. No. 93,835, filed Nov. 13, 1979, now U.S. Pat. No. 4,331,035.

DESCRIPTION

1. Technical Field

This invention relates to thin film strain gage sensors and in particular to means for adjusting resistance values thereof.

2. Background Art

In one form of strain gage, the device is formed as a thin film structure on the inflectible body. In another form, the strain gage is bonded to the inflectible body.

A number of different structures have been developed for utilizing variable resistances for use as strain gages and the like. Illustratively, a variable resistance pad is disclosed in U.S. Pat. No. 3,657,692 of Hans H. Wormser, wherein a portion of highly conductive material partly surrounds a channel in which there is placed resistive material of a specified geometric shape, the combination of the materials forming the resistance pad.

A piezoresistive strain gage structure is shown in U.S. Pat. No. 3,624,714 of James E. Frassrand. The transducer includes an edge-supported flexible diaphragm with a semiconductor chip providing a bridge arrangement of the piezoresistive strain gage areas bonded to the inner surface to position active tension gage areas at the center of the diaphragm and active compression gage areas at the periphery thereof.

In one form of strain gage, resistances are connected in a Wheatstone bridge arrangement. Roscoe A. Ammon discloses, in U.S. Pat. No. 2,740,093, a meter tester utilizing a Wheatstone bridge for determining the current sensitivity and internal resistance of direct current instruments, such as voltmeters and ammeters. To compensate for deviations in the unknown resistance of the meter from normal or rated resistance, the disclosed bridge is provided with a variable resistance having a plurality of ganged taps.

It is further conventional in strain gages to use an elastically deformable body arranged to concentrate the strains in localized portions thereof and more specifically, to localize compressive and tensile strains in different portions defined by an outer surface of the body. One such structure is shown in U.S. Pat. No. 3,341,796 to Walter H. Eisele. In connection with such a structure, an arrangement of a Wheatstone bridge circuit such that two of the strain gages of the circuit are mounted to the surface of the body defined by the high compressive strain portion and two of the strain gages are mounted to the body surface defined by the portion having high tensile strain. It is desirable in such a structure to provide the strain gage resistors to be of equal value in the unstrained state, i.e. to satisfy the equation:

$$(R1+R2/R2)=(R4+R3/R3).$$

It has been necessary to provide some balance adjustment in the manufacture of such strain gages as the film manufacturing techniques of photolithography and sputter deposition do not provide the necessary high accuracy. Conventionally, such adjustment has been effected by laser trimming, anodizing, air abrasive methods, etc. Such techniques, however, have been found to adversely affect the performance characteristics of the gage.

As it is desirable to form the gage depositions to provide as nearly as possible original balance, the actual imbalance may be slightly positive or negative. Further, installation of the sensor element into the gage body and breaking-in treatment may alter the imbalance in either direction so that it is necessary to provide the final correction in either direction of adjustment.

Further, it is desirable to construct the gage compactly so as to permit all portions thereof to be subject to the same operational thermal conditions.

DISCLOSURE OF INVENTION

The present invention comprehends an improved thin film gage structure having a high balance accuracy while yet being extremely simple and economical of construction.

More specifically, the invention comprehends providing such a thin film gage structure wherein discrete adjusting resistors are deposited on the body carrying the thin film strain sensing resistors. Means are provided for connecting different selected ones of said adjusting resistors in series with said sensing resistors so as to provide accurate balancing of the bridge strain gage.

The invention comprehends the deposition of the adjusting resistors adjacent the sensing resistors so as to maintain the adjusting resistors substantially under the same temperature conditions as the sensing resistors.

The invention comprehends that the adjusting resistors may be formed in the same deposition process as the sensing resistors for further facilitated economy in manufacture.

The adjusting resistors may be formed to have identical pertinent characteristics as the sensing resistors as by the forming thereof in the same deposition process.

The forming of the adjusting resistors concurrently with the sensing resistors eliminates the need for connections between separately formed components and effectively minimizes the cost of the gage structure.

The adjusting resistance means may be defined by a spaced series of discrete resistances having taps associated therewith, permitting adjustment of the sensing resistance by suitably connecting to a selected tap or taps.

The sensing resistors may be suitably positioned relative to compressionally stressed and tensionally stressed portions of the inflectible body so as to provide desired sensitivity to strain. The adjusting resistors are preferably located coplanarly adjacent the sensing resistors on a noninflectible portion of the body permitting the lead contacts to be carried on the noninflectible portion of beam, permitting the use of a minimum number of leads, i.e. 5 leads. Alternatively, the adjustment resistors may be disposed on an inflectible portion of the body although this may require a greater area of the deflectible beam portion mounting surface.

The taps connected to the adjusting resistance means may be arranged to effect adjustment of the resistance by shorting out portions thereof or by adjusting the amount of resistance connected in series from the taps to the sensing resistors, as desired.

The invention comprehends forming the gage assembly on the element surface and subsequently adding the mechanical components, such as link pin, diaphragm, and other mechanical components for sensing pressure, so as to effect balancing adjustment of the complete transducer by means of the adjusting resistors and thereby compensate for all offsets including any mechanical offsets.

Thus, the strain gage structure of the present invention is extremely simple and economical of construction while yet providing a highly improved functioning as discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
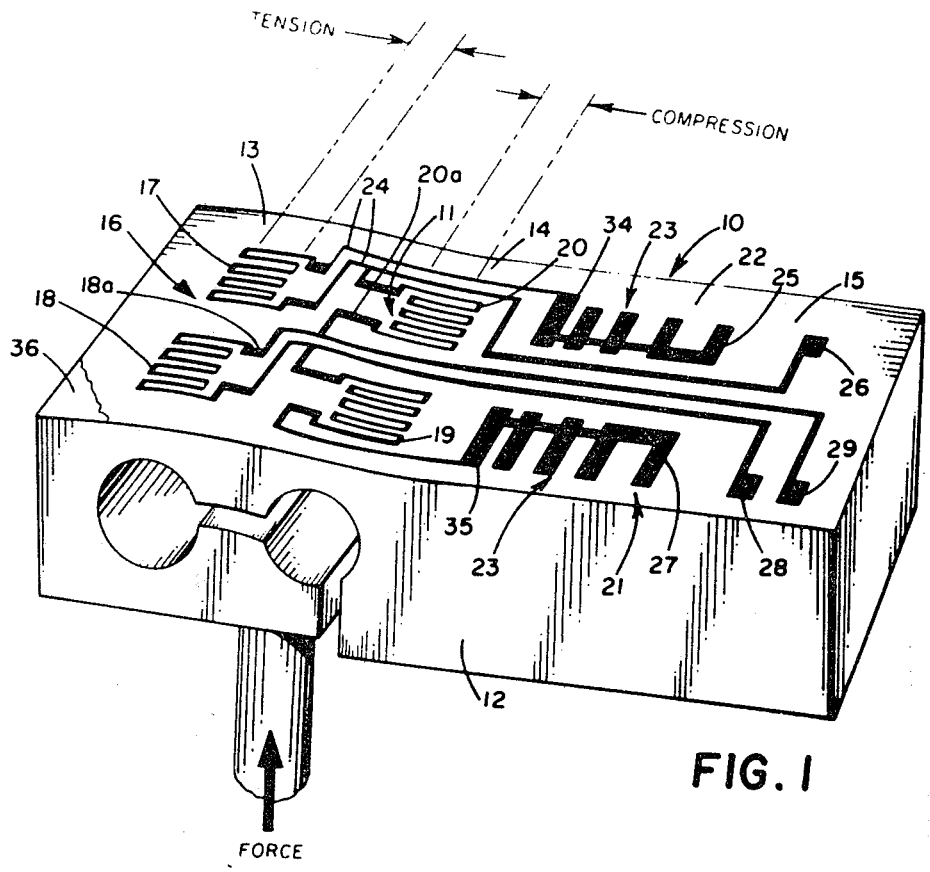
FIG. 1 is a perspective view of a strain gage structure embodying the invention.
Figure 2:
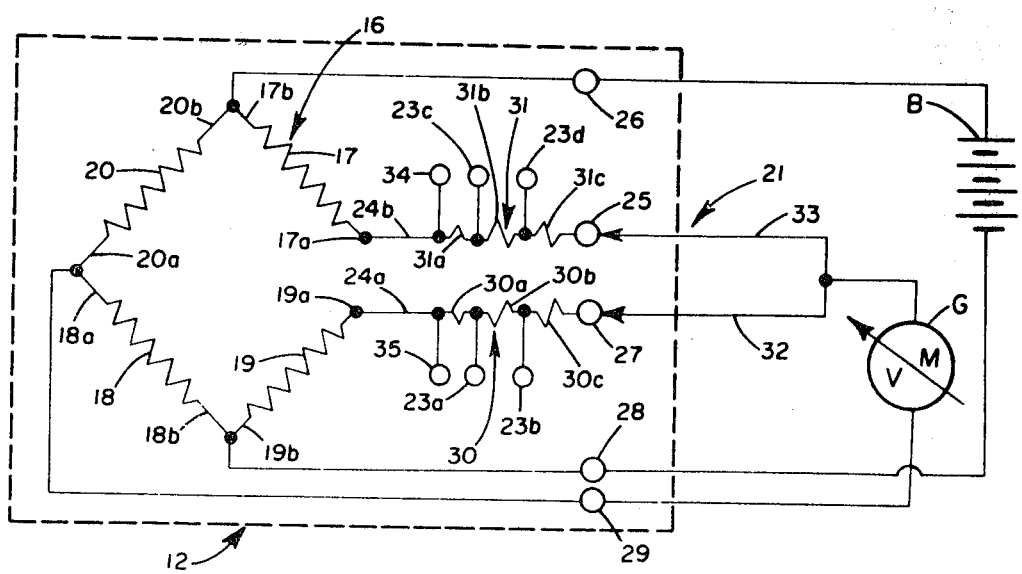
FIG. 2 is a schematic wiring diagram of the strain gage.

In the exemplary embodiment of the invention as disclosed in FIGS. 1 and 2 of the drawing, a thin film gage structure generally designated 10 is shown to comprise a thin film sensing resistance generally designated 11 deposited on an inflectible element generally designated 12. Where the element 12 is formed of a conductive material such as metal, the surface 15 thereof may be provided with a conventional insulative layer.

As shown in FIG. 1 of the drawing, the inflectible element may include a first portion 13 which is subjected to tensional stress, and a second portion 14 which is subjected to compressional stress. The strain gage may be formed in situ by conventional deposition processes and the like on the insulative surface 15 of the inflectible element and may include a Wheatstone bridge arrangement generally designated 16 including four sensing resistors 17, 18, 19 and 20. As shown in FIG. 1, resistors 17 and 18 may be deposited on surface 15 in the tensional stress area 13 and resistances 19 and 20 may be formed on surface 15 in the compressional stress area 14.

As further shown in FIG. 1, the strain gage includes an adjusting resistance portion generally designated 21 which may be formed on the surface 15 adjacent the bridge arrangement 16 and preferably in a noninflectible area 22 thereof.

The invention comprehends the forming of the strain gage 11 by concurrent formation of the bridge portion 16 and the adjusting resistance portion 21 as by conventional sputter deposition and photolithographic techniques well known to those skilled in the art. As a result of the concurrent formation of the sensing and adjusting resistances, low cost in the formation of the accurately balanced strain gage 10 is readily obtained.

As further shown in FIG. 1, the adjusting resistance portion 21 includes a plurality of conductive taps 23. Surface 15 may be defined by a suitable layer of electrically insulative material on which the resistance material and tap material may be deposited to form the desired strain gage structure. The strain gage structure illustrated in FIGS. 1 and 2 is exemplary of one such strain gage configuration, it being obvious to those skilled in the art that any suitable configuration may be employed within the scope of the invention.

Connections may be provided between the adjusting resistance 21 and the strain sensing resistance 16 in the form of deposited connectors 24. The connectors may comprise metallization deposits made concurrently with the deposition of the taps 23. As further shown in FIG. 1, the connections 24 may further include end connections 25, 26, 27, 28 and 29 in the form of taps similar to taps 23.

The functioning of the strain gage may be best understood by reference to FIG. 2. More specifically, as shown therein, the Wheatstone bridge 16 is defined by a bridge arrangement of resistances 17, 18, 19 and 20.

One end 19a of resistor 19 is connected to a first portion 30 of adjusting resistance 21. One end 17a of resistor 17 is connected to a second portion 31 of adjusting resistor 21. As shown in FIG. 2, adjusting resistor portion 30 may include a plurality of discrete resistances 30a, 30b, and 30c connected in series and separated by taps 23a and 23b, respectively. Similarly, second portion 31 of the adjusting resistance includes a series of discrete resistances 31a, 31b and 31c separated by taps 23c and 23d, respectively. Sensing resistor end 17a is connected to the resistance 31a by a connector portion 24b.

End 17b of resistor 17 and end 20b of resistor 20 are connected in common to tap 26. End 20a of resistor 20 and end 18a of resistor 18 are connected in common to tap 29. End 18b of resistor 18 and end 19b of resistor 19 are connected in common to tap 28.

A voltmeter G may be connected from tap 29 to a parallel connection of taps 25 and 27. A suitable direct current source, such as battery B, may be connected between taps 28 and 26 for effecting a suitable readout of the strain in element 12 by means of the voltmeter G.

The connection of lead 24b to resistance 31a may be by means of a tap 34 and the connection of lead 24a to resistance 30a may be by means of a tap 35. Thus, adjustment of the adjusting resistor portions 30 and 31 may be effected by suitably connecting leads 32 and 33 to selected ones of the different taps. Illustratively, lead 32 may be selectively connected to any one of tap 35, tap 23a, tap 23b, or tap 27. In the illustrated embodiment, resistance 30a represents one unit, resistance 30b represents two units, and resistance 30c represents two units. Resistance 31a represents one unit, resistance 31b represents two units, and resistance 31c represents two units. As shown in FIG. 2, the connection to resistor 31a from lead 24b may comprise a tap 34 and the connection of lead 24a to resistance 30a may comprise a tap 35. The connection of voltmeter G to taps 27 and 25 may be through leads 32 and 33, respectively.

Thus, lead 27 may be selectively connected to any of taps 35, 23a, 23b or 27 and lead 33 may be selectively connected to any of taps 34, 23c, 23d, or 25. Resultingly, by connecting lead 32, for example, to tap 27 and lead 33 to tap 34, an increase in the resistance of resistor 19 relative to resistance 17 of five units may be provided. Reversely, by connecting lead 32 to taps 35 and lead 33 to tap 25, resistance 17 may be increased relative to resistance 19 by five units. As will be obvious to those skilled in the art, by suitably connecting the leads 32 and 33 to different ones of the taps of the respective adjusting resistance portions 30 and 31, different balancing adjustments of the resistances of resistors 17 and 19 may be effected.

In one form, the discrete resistors of the adjusting resistance portions 30 and 31 may be arranged in a binary succession (i.e. 1 ohm, 2 ohms, 4 ohms, 8 ohms, etc.) whereby, the shorting out of different portions thereof, the sensing resistors may be adjusted by one unit differences over a substantial range. Thus, as will be obvious to those skilled in the art, the invention comprehends an arrangement of the discrete adjusting resistors suitably to permit adjustment alternatively by connection of the leads 32 and 33 to different ones of the adjusting resistor taps or by suitably shorting out different discrete resistance portions of the adjusting resistors with the leads 32 and 33 maintained connected to taps 27 and 25 within the scope of the invention.

The invention further comprehends that only a single adjusting resistance portion may be utilized to adjust the balance in both directions, i.e. positively and negatively. Thus, the bridge resistors may be formed to be biased to an imbalance in one direction sufficiently, within the tolerances of the forming process, to assure that effective balancing may be effected by adjusting a single leg of the bridge resistance.

Thus, the invention comprehends that the adjusting resistance 21 could include resistors connected to any number of legs of the bridge as desired, the two-leg adjusting resistance being exemplary of one advantageous arrangement.

As indicated briefly above, to provide further improved functioning of the strain gage, it has been found advantageous to connect the mechanical components of the device and effect a breaking-in of the complete structure as by causing a series of inflections of the strain gage prior to effecting the desired adjusting connections to the adjusting resistors.

As indicated above, the sensing resistors 16 and adjusting resistors 21 are preferably formed by thin film deposition techniques so as to permit concurrent forming thereof of similar material. An overlying protective insulating, or passivation, layer 36 (shown fragmentarily in FIG. 1) may be provided over the entire strain gage structure with the electrical connection areas then being exposed by selective removal of the insulating layer therefrom.

Figure 3:
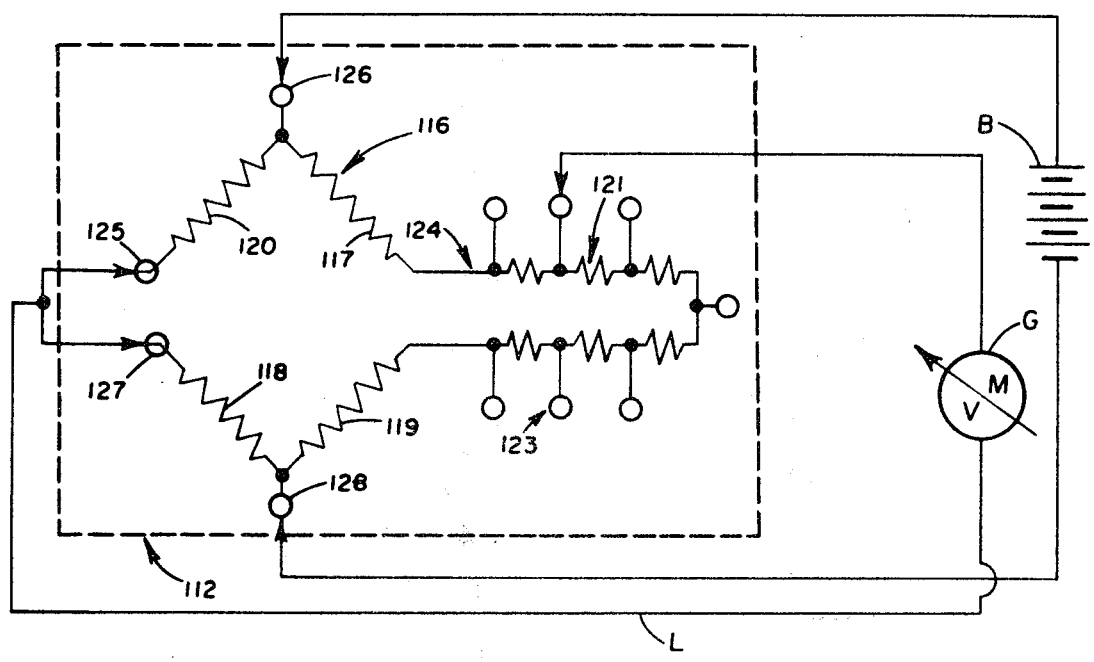
FIG. 3 is a schematic wiring diagram of a modified form of strain gage embodying the invention.

Referring now to FIG. 3, a modified gage structure generally designated 110 is shown to comprise a structure generally similar to gage structure 10 but having a modified form of adjusting resistance portion generally designated 121 for adjustably balancing the bridge 116.

More specifically, as shown in FIG. 3, the adjusting resistance portion 121 is provided with a plurality of conductive taps 123 and is connected through the connectors 124 between the bridge resistors 117 and 119.

The opposite corner of the bridge defined by connectors 125 and 127 is open and is connected through a suitable lead L selectively to any one of the taps 123 through the voltmeter G. Thus, the total adjusting resistance connected between bridge resistors 117 and 119 remains constant while the ratio of the resistance connected alternatively to resistors 117 and 119 may be varied by suitable selection of the desired tap 123 to which the lead L is connected.

The provision of the open corner defined by connectors 125 and 127 permits zeroing the bridge in use.

In the illustrated embodiment, the corner of the bridge at connector 126 is connected through the battery to the corner at connector 128. Thus, the gate structure 110 functions in a manner similar to the gage structure 10 in permitting selective adjustment of the balancing of the bridge by selective connection to any one of a plurality of taps connected to the adjusting resistor connected between a pair of the bridge resistances. Elements of gate structure 110 which correspond to elements of gage structure 10 are identified by similar reference numerals but 100 higher.

Industrial Applicability

The thin film sensors of the present invention are advantageously adapted for use in a wide range of sensor applications and more specifically, are advantageously adapted for use as strain gage sensors.

As indicated above, the improved sensor devices provide accurate facilitated balancing and adjustment of the resistance values in a novel and simple manner. The sensors may be manufactured at low cost, thus making them adaptable for use in a wide range of sensing applications.

The foregoing disclosure of specific embodiments is illustrative of the broad inventive concepts comprehended by the invention.

We claim:

1. The method of forming a thin film strain gage (10) on a member (12) having a first portion subjected to tensional stress (13), a second portion subjected to compressional stress (14) and a third portion (22) not subjected to stress, and an insulative surface (15) on said first, second and third portions, said method comprising the steps of:
   depositing a thin film resistive layer (11,21) on said insulative surface;
   forming the resistive layer into (a) a sensing resistor means (11) deposited on said first and second portions for providing a variable resistance as an incident of inflection of said member, and (b) an adjusting resistor means (21) deposited on said third portion and comprising a resistance (30,31) connected in series with said sensing resistor means, said adjusting resistor means being formed coplanarly adjacent said sensing resistor means; and
   providing connection means (23) on said member electrically connected to different portions of said adjusting resistor means to permit selection of any one of a plurality of different adjusting resistances to be connected in series with said sensing resistor means to effect accurate adjustment thereof.

2. The method of forming a thin film strain gage of claim 1 wherein said connection means (23) are formed as a deposited thin film layer.

3. The method of forming a thin film strain gage of claim 1 wherein said resistive layer is deposited on an outer surface (15) of said member.

4. The method of forming a thin film strain gage of claim 1 wherein said member defines a deflectible portion (13,14) and an adjacent nondeflectible portion (22), said sensing resistance means (11) being formed on said deflectible portion and said adjusting resistor means (21) being formed on said nondeflectible portion.

5. The method of forming a thin film strain gage of claim 1 including the step of providing a protective insulative layer over the entire gage, and selectively exposing the connection means therethrough.

6. The method of forming a balanced thin film Wheatstone bridge strain gage (11,21) on a member (12) having a first portion subjected to tensional stress (13), a second portion subjected to compressional stress (14) and a third portion (22) not subjected to stress, and an insulative surface (15) on said first, second and third portions, said method comprising the steps of:
   depositing a thin film resistive layer (16,21) on said insulative surface;
   forming the resistive layer into (a) a Wheatstone bridge sensing resistor means (16) deposited on said first and second portions for providing a variable resistance as an incident of inflection of said member, and (b) an adjusting resistor means (21) deposited on said third portion and comprising a resistance (30,31) connected in series with at least one leg of said sensing resistor means, said adjusting resistor means being formed coplanarly adjacent said sensing resistor means; and providing an electrical connection (23) to said adjusting resistor means to select any one of a plurality of different adjusting resistance values to be connected in series with said sensing resistor means (16) to effect accurate balance thereof.

7. The method of forming a balanced thin film strain gage of claim 6 wherein said adjusting resistor means (21) comprises resistors (30,31) connected in series with two legs (17,19) of the Wheatstone bridge sensing resistor means.

8. The method of forming a balanced thin film strain gage of claim 6 wherein said sensing resistor means (16) is formed to be biased at least a preselected amount in one direction from a balanced condition to permit adjustment of the adjusting resistor means (21) in one leg only of the bridge of said sensing resistor means to effect accurate balancing of said bridge.

9. The method of forming a balanced thin film strain gage of claim 6 wherein said sensing resistor means (16) is formed to be substantially balanced and the accurate balancing thereof is effected by selective adjustment of the adjusting resistor means (21) in series with either of two legs (17,19) of the bridge of said sensing resistor means (16).

* * * * *